United States Patent [19]

Mittelhäuser et al.

[11] Patent Number: 4,872,636
[45] Date of Patent: Oct. 10, 1989

[54] EXTERIOR MIRROR FOR A VEHICLE

[75] Inventors: Bernhard Mittelhäuser, Am Krähenberg, D-3002 Wedemark 2; Bernd Winkler, Burgwedel, both of Fed. Rep. of Germany

[73] Assignee: Bernhard Mittelhäuser, Wedemark, Fed. Rep. of Germany

[21] Appl. No.: 185,166

[22] Filed: Apr. 22, 1988

[30] Foreign Application Priority Data

Apr. 24, 1987 [DE] Fed. Rep. of Germany ....... 3713689

[51] Int. Cl.$^4$ ............................................... A47G 1/16
[52] U.S. Cl. ................................. 248/475.1; 248/549; 248/900
[58] Field of Search ...................... 248/475.1, 900, 479, 248/483, 549, 284, 486; 350/604, 631, 632

[56] References Cited

U.S. PATENT DOCUMENTS 1,749,868  3/1930  Anderson .......................... 248/483
2,724,996  11/1955  O'Shei ............................ 248/475.1

FOREIGN PATENT DOCUMENTS 2403621  8/1974  Fed. Rep. of Germany ...... 248/479
1240563  8/1960  France ............................... 248/900
605364  5/1960  Italy ................................... 248/900
995664  5/1965  United Kingdom ................ 248/479

Primary Examiner—Ramon S. Britts
Assistant Examiner—Karen J. Chotkowski
Attorney, Agent, or Firm—Becker & Becker, Inc.

[57] ABSTRACT

An exterior mirror for a vehicle, including a support or base mounted on the vehicle, and a housing that accommodates a mirror body and is mounted on the support or base in such a way that it is pivotable to the front and to the rear relative to the forward direction of travel of the vehicle. The housing is pivotable against a spring force in such a way that after a pivoting movement the housing returns to a normal position. A slide member is mounted to the housing and in the normal position of the latter rests against the base of an approximately V-shaped channel in the mirror base or support under spring force. During pivoting of the housing in one direction, the slide member, against the spring force, moves along one of the side surfaces of the channel, while during pivoting of the housing in the opposite direction, the slide member moves along the other side surface of the channel.

8 Claims, 2 Drawing Sheets

EXTERIOR MIRROR FOR A VEHICLE

BACKGROUND OF THE INVENTION

The present invention relates to an exterior mirror, such as a side view or rear view mirror, for a motor vehicle. The mirror includes a support or base that is adapted to be mounted on the vehicle, and a housing that accommodates a mirror body and is mounted on the support or base in such a way that it is pivotable to the front and to the rear relative to the longitudinal direction or forward direction of travel of the vehicle. The housing is pivotable against a return force or spring force in such a way that after a pivoting movement the housing returns to a normal position.

Such a mounting of the housing, along with the mirror body that is disposed therein, is advantageous from a safety standpoint; unfortunately, the heretofore known methods of mounting a housing for achieving the aforementioned effects are relatively complicated and expensive.

It is therefore an object of the present invention to be able, with straightforward technical means, to mount the mirror housing in such a way that the housing returns to its normal position even after the housing has carried out a large pivot movement.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
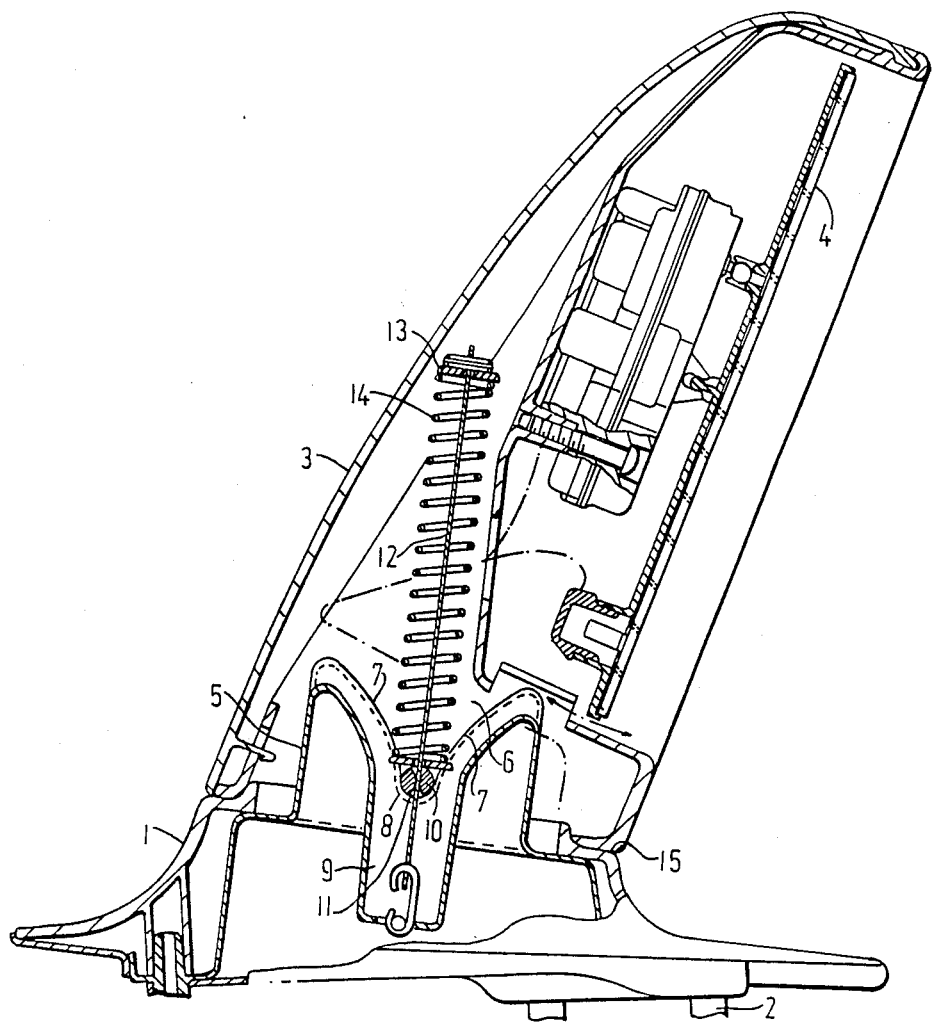
FIG. 1 is a partial, horizontal, cross-sectional view of one exemplary embodiment of the inventive exterior rear view mirror for passenger cars.

The mirror of the present invention is characterized primarily in that: the support or base is provided with an approximately V-shaped recess or channel that is delimited by a base and two side walls or surfaces; a slide member or pin is mounted to the housing and in the normal position of the latter rests against the base of the recess or channel under spring force, whereby during pivoting of the housing in one direction, the slide member, against the spring force, slides or moves along one of the side surfaces, while during pivoting of the housing in the opposite direction, the slide member moves along the other side surface; and means are connected to the support or base for providing the spring force to return the housing and for providing the spring force against the slide member.

The depth of the recess or channel in the support or base is such that no matter how great the pivoting movement of the housing, the slide member or pin still rests against the side walls. In other words, even under extreme pivoting conditions, the slide member cannot leave the recess or channel. Since the slide member is under spring force, and since the side surfaces of the recess or channel are V-shaped, i.e. extend at an angle, the spring force results in a pivoting of the housing back into its normal position, whereby the slide member again rests upon the base of the channel recess or.

In order to take into account the fact that the spring force increases as the housing pivots away from its normal position, it is proposed pursuant to a particularly expedient embodiment of the present invention that the sliding surfaces of the recess or channel of the mirror base or support be convex, curving symmetrically to the outside so as to widen in a trumpet-like manner.

The slide member is preferably embodied as an approximately vertically extending pin through which a preferably slightly flexible connecting rod or tie rod extends. One end of the tie rod is connected to the mirror base or support, and the other end of the tie rod extends beyond the pin for supporting the upper end of the spring, with the lower end of the spring being acted upon or supported by the pin. Under these conditions, the slide member, accompanied by compression of the spring, can shift upon the tie rod when the housing is to be pivoted. Along with this shifting upon the tie rod, the slide member or pin slides along the aforementioned side walls or surfaces of the recess or channel of the mirror base or support.

Further specific features of the present invention will be described in detail subsequently.

DESCRIPTION OF PREFERRED EMBODIMENTS

Referring now to the drawings in detail, the illustrated rear view or side view mirror essentially comprises a support or base 1 that is adapted to be secured to a vehicle via attachment elements 2, and also a shell-shaped housing 3 that accommodates an adjustably mounted mirror body 4.

Extending into that end of the housing 3 that faces the vehicle is a projection 5 that is secured to the support or base 1. The free end of the projection 5 is provided with an essentially V-shaped channel 6 that is open in the direction toward the housing 3, and is delimited toward the sides by convex side surfaces 7. Disposed below the base 8 of the recess or channel 6 is a recessed portion 9. At that end that faces the support or base 1, the housing 3 is provided with a pin 10 that extends approximately vertically. The pin 10 is provided with an approximately horizontal hole 11 through which extends a connecting rod or tie rod 12, which is also disposed approximately horizontally. That end of the tie rod 12 that is directed toward the vehicle is secured in the recessed portion 9. The free end of the tie rod 12 is provided with an abutment 13 for one end of a compression spring 14 that surrounds the tie rod 12; the other end of the spring 14 rests upon the pin 10. The compression spring 14 is prestressed in such a way that it always tries to hold the pin 10 on the base 8, and hence tries to hold the housing 3 in its normal position and the mirror body 4 in its operative position.

If the housing 3 is bumped or struck in the forward or rearward direction of travel of the vehicle, the housing 3 is designed to flexibly deflect or swing away in this direction, and to return to the position illustrated in FIG. 1 when the stress is removed.

Under the effect of such an impact, the rear edge 15 of the housing 3 (relative to the forward direction of travel of the vehicle) is supported upon the support or base 1, while the pin 10, accompanied by compression of the spring 14, slides along the rear side surface 7, thus permitting a flexible pivoting of the housing 3. After the impact effect upon the housing 3 has been terminated, the compression spring 14 presses the pin 10 back into the position illustrated in FIG. 1, whereupon the housing 3 is straightened out, and again establishes the position that is necessary for the mirror body 4.

Figure 2:
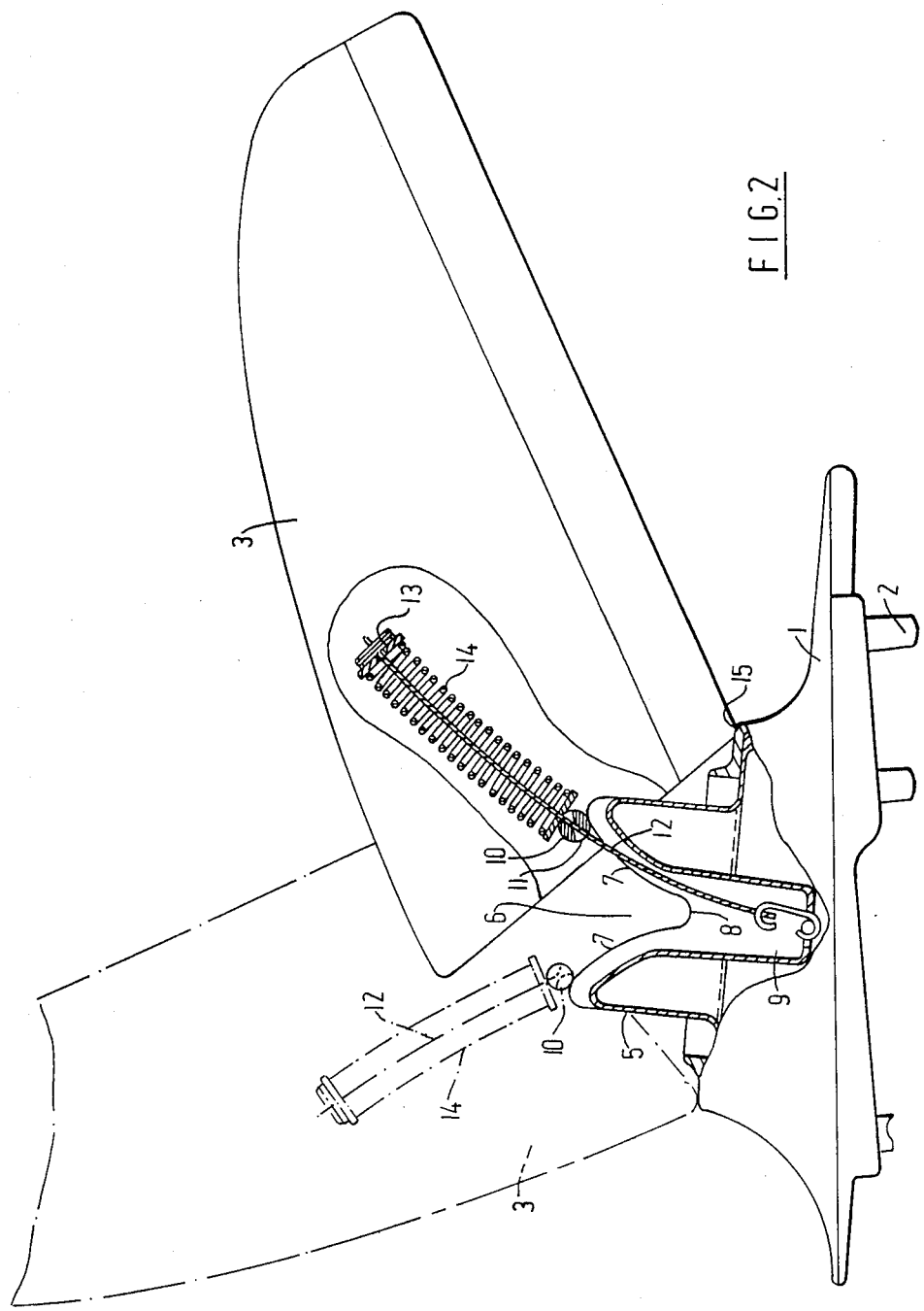
FIG. 2 is a partial, horizontal, cross-sectional view of the mirror of FIG. 1 with the housing in a pivoted position.

If the housing 3 is stressed in the opposite direction, a similar effect occurs due to the paired side surfaces 7. The corresponding position of the housing 3 is shown by dot-dash lines in FIG. 2.

So that the pivoted position of the housing 3 can be reliably and safely achieved, the tie rod 12 is flexible. In addition, the hole 11 in the pin 10 has ends that open out conically in order to permit this bending of the tie rod 12. Furthermore, so that the tie rod 12 can carry out the aforementioned bending movements, yet is rigid transverse to the direction of bending, a leaf spring or sheet steel is used for the tie rod.

The present invention is, of course, in no way restricted to the specific disclosure of the specification and drawings, but also encompasses any modifications within the scope of the appended claims.

What we claim is:

1. In an exterior mirror for a vehicle, including a support that is adapted to be mounted on the vehicle, and a housing that accommodates a mirror body and is mounted on said support in such a way that it is pivotable to the front and to the rear relative to the forward direction of travel of said vehicle, with said housing being pivotable against a spring force in such a way that after a pivoting movement, said housing returns to a normal position, the improvement wherein:
   said support is provided with an approximately V-shaped recess that is delimited by a base and two side surfaces;
   rod means and a slide member are substantially vertically disposed as to each other and mounted relative to said housing and in a normal position, said slide member rests against said base of said channel under spring force; during pivoting of said housing in a given direction, said slide member, against said spring force, moves along one of said side surfaces of said recess, while during pivoting of said housing in the opposite direction, said slide member moves along the other of said side surfaces of said recess; and wherein
   spring means is connected to said mirror support for providing said spring force against said slide member to thereby provide said spring force to return said housing to a normal position,
   said side surfaces of said recess of said mirror support having a convex configuration.

2. An exterior mirror according to claim 1, in which said side surfaces curve symmetrically in a trumpet-like manner outwardly away from said base of said recess.

3. An exterior mirror according to claim 1 which includes a tie rod that is connected to said mirror base and extends through said slide member; and in which said spring means is a compression spring that surrounds said tie rod and has two ends, one of which is secured to said tie rod remote from said mirror base, and the other end of which is supported against said slide member.

4. An exterior mirror according to claim 1, in which said channel of said mirror base has a depth that is sufficient to prevent said slide member from jumping out of said channel during pivoting of said housing.

5. In an exterior mirror for a vehicle, including a support that is adapted to be mounted on the vehicle, and a housing that accommodates a mirror body and is mounted on said support in such a way that it is pivotable to the front and to the rear relative to the forward direction of travel of said vehicle, with said housing being pivotable against a spring force in such a way that after a pivoting movement, said housing returns to a normal position, the improvement wherein:
   said support is provided with an approximately V-shaped recess that is delimited by a base and two side surfaces;
   means including a slide member that is mounted relative to said housing and in a normal position, said slide membe rests against said base of said recess under spring force; during pivoting of said housing in a given direction, said slide member, against said spring force, moves along one of said side surfaces of said recess, while during pivoting of said housing in the opposite direction, said slide member moves along the other of said side surfaces of said recess; and wherein
   spring means is connected to said mirror support for providing said spring force against said slide member to thereby provide said spring force to return said housing to a normal position; and
   a tie rod that is connected to said mirror support and extends through said slide member; said spring means being a compression spring that surrounds said tie rod and has two ends, one of which is secured to said tie rod remote from said mirror support, and the other end of which is supported against said slide member,
   said slide member being a pin that extends approximately vertically relative to said tie rod.

6. An exterior mirror according to claim 5, in which said mirror base is furthermore provided with a recessed portion in the vicinity of said base of said channel, with said tie rod having an end that is anchored to said mirror base in said recessed portion thereof remote from where said compression spring is connected to said tie rod.

7. An exterior mirror according to claim 5 in which said tie rod has a flat quadrilateral cross-sectional shape, and is flexible, with the greatest flexibility of said tie rod being in the direction of pivot of said housing.

8. An exterior mirror according to claim 5, in which said slide member is provided with a hole through which said tie rod extends, with said hole having conical ends.

* * * * *